(12) United States Patent
Turnbull et al.

(10) Patent No.: US 8,321,913 B2
(45) Date of Patent: Nov. 27, 2012

(54) LOCATION BASED AUTHENTICATION

(75) Inventors: Rory S. Turnbull, Ipswich (GB); Richard Gedge, Woodbridge (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1115 days.

(21) Appl. No.: 11/887,405

(22) PCT Filed: Mar. 10, 2006

(86) PCT No.: PCT/GB2006/000856
§ 371 (c)(1), (2), (4) Date: Sep. 28, 2007

(87) PCT Pub. No.: WO2006/103387
PCT Pub. Date: Oct. 5, 2006

(65) Prior Publication Data
US 2009/0254975 A1 Oct. 8, 2009

(30) Foreign Application Priority Data
Mar. 31, 2005 (EP) ..................... 05252021

(51) Int. Cl.
*G06F 21/00* (2006.01)
(52) U.S. Cl. ..................... 726/4; 726/2; 726/3
(58) Field of Classification Search ............. 726/2–4
See application file for complete search history.

(56) References Cited

U.S. PATENT DOCUMENTS

| | | | |
|---|---|---|---|
| 5,757,916 A | 5/1998 | MacDoran et al. | |
| 5,790,074 A | 8/1998 | Rangedahl et al. | |
| 2002/0125886 A1 | 9/2002 | Bates et al. | |
| 2003/0140246 A1 | 7/2003 | Kammer et al. | |
| 2003/0140276 A1 | 7/2003 | Sagatelian | |
| 2004/0190718 A1 | 9/2004 | Dacosta | |

FOREIGN PATENT DOCUMENTS

| | | |
|---|---|---|
| WO | 01/28272 A1 | 4/2001 |
| WO | 02/093502 | 11/2002 |

OTHER PUBLICATIONS

International Search Report for PCT/GB2006/000856 mailed May 15, 2006.
Denning et al., "Locations-based Authentication: Grounding Cyberspace for Better Security," Feb. 1996, Computer Fraud and Security, Oxford, GB, pp. 12-16, XP002117683.
Written Opinion of the International Searching Authority issued in International Application No. PCT/GB2006/000856.
International Preliminary Report on Patentability issued in International Application No. PCT/GB2006/000856.
Denning, D. E., and MacDoran, Peter F.; "*Location-Based Authentication Grounding Cyberspace for Better Security*"; published in Computer Fraud & Security, Feb. 1996, Elsevier Science Ltd., 6 pages.
European Examination Report (pp. 1-4) dated Feb. 28, 2011 issued in EP Application No. 06 710 065.1.

*Primary Examiner* — Farid Homayounmehr
*Assistant Examiner* — Lisa Lewis
(74) *Attorney, Agent, or Firm* — Nixon & Vanderhye P.C.

(57) ABSTRACT

The present invention relates to authenticating a mobile device using logical location information associated with the device which provides an indication of the proximity of the device to other devices. The present invention provides a mechanism for authenticating a mobile device based on location related information or a "logical location", but without requiring an actual location. The mobile user device identifies or discovers other devices, using direct wireless communication, within its vicinity and forwards this information to the authenticating authority. If this information matches previous or otherwise predetermined information, then the device is authenticated.

30 Claims, 3 Drawing Sheets

LOCATION BASED AUTHENTICATION

This application is the U.S. national phase of International Application No. PCT/GB2006/000856, filed 10 Mar. 2006, which designated the U.S. and claims priority to European Patent Application No. 05252021.0, filed 31 Mar. 2005, the entire contents of each of which are hereby incorporated by reference.

BACKGROUND

1. Technical Field

The present invention relates to authenticating a mobile device using location information associated with the device.

2. Description of Related Art

In order for a server to provide a mobile device with resources such as access to a locally stored document or the Internet, the server usually requires the device to be authenticated. This typically takes the form of the user of the device entering a username and password in response to an authentication challenge from the server, following a request for resources by the mobile device. These authentication signals are often encrypted when provided over a wireless channel for additional security.

However with the increasing use of wireless devices in gaining access to central system resources such as work or corporate documents and communications, it has become burdensome for the user to continually enter their password and user name each time access for some application is required. Furthermore, the user interface on many mobile devices is limited, making the authentication process time consuming and difficult for the user. This problem may be exacerbated where the level of authentication required is increased and the user is asked for more credentials such as date of birth and mother's maiden name.

One solution to this problem is using a location based authentication mechanism. This relies on the idea that if the mobile device is in a restricted area, eg the work place, then the device is unlikely to have been stolen and normal authentication requirements can be relaxed. If however the device is away from the office, for example at the user's home, then the usual username and password authentication is required. Such an arrangement is described in WO04/095857; however this arrangement requires complex additional systems to be installed in the mobile device, for example GPS positioning, adaptive antenna arrays and/or multi-path fingerprinting in order to confirm the mobile's location within the office building or other "low authentication requirements" area. Such additional systems are expensive, and often not available on standard or low cost mobile devices.

United States Patent Application number US2004/0190718 entitled "APPARATUS AND METHOD FOR LOCATION BASED WIRELESS CLIENT AUTHENTICATION" describes a method in which once an authentication/access request from a wireless client desiring access to a wireless network is received, a spatial location of the client is identified, and compliance with the authentication/access request is performed according to the identified spatial location of the device. This method requires a physical location being determined for the wireless client device or for some other determination to be made that the client is within the bounds of a predefined wireless network boundary.

International Patent Application number WO01/28272 entitled "METHOD AND SYSTEM FOR FINDING THE POSITION OF MOBILE TERMINALS" relates to a triangulation type method of locating a mobile terminal based on the mobile terminal measuring the field strengths of adjacent base stations and passing these on to a position-finding server.

International Patent Application number WO 02/093502 entitled "REMOTELY GRANTING ACCESS TO A SMART ENVIRONMENT" describes a system in which a terminal is provided with a unique identification code which is wirelessly transmitted and received by other appliances and terminals. When an appliance receives a transmitted unique identification code, the receiving appliance queries a database to determine if the terminal is authorized to control the appliance based on authorization information stored in the database. Also described is a method of a remote owner authorizing a local user to control the appliances.

BRIEF SUMMARY OF EXAMPLE EMBODIMENTS

One aspect of the invention provides a method of authenticating a mobile wireless user device, the method comprising: identifying other devices as being within the proximity of the user device using wireless communication between the user device and the other devices; comparing the identities of said other devices with reference identities; and authenticating said user device when the identity comparison meets a threshold.

In one embodiment, the method further comprises the step of: determining for at least one identified other device a proximity range value indicating the proximity of the device to the user device; comparing said range value with a reference range value for said identified other device; and, authenticating said user device if said proximity comparison indicates said proximity range value is an acceptable proximity range being a proximity range value less or equal to said reference proximity range value.

In one embodiment, said proximity range value is determined by said user device detecting a physical characteristic of a communications signal between a said other wireless device and said user device.

In one embodiment, said method steps are implemented for all said other wireless devices, and said authentication step requires all proximity comparisons to indicate that said user device is within a range of proximity less or equal to a reference range for each of said other wireless devices.

In one embodiment, said authentication is performed automatically as soon as said user device enters a proximity range sufficient for authentication.

In one embodiment, said user device is further identified by its spatial location, wherein the spatial location is determined by the proximity of the device to a plurality of fixed spatial reference points associated with said other wireless devices.

In one embodiment, the wireless communication comprises using one or more wireless access technologies to directly communicate with one or more of said other devices in order to request respective identities.

In one embodiment, one or more said wireless access technologies are used to communicate with all said other devices having said wireless access technology capability within the respective ranges of said user device.

In one embodiment, the wireless access technology comprises one ore more of the following group: IEEE802.11a; IEEE802.11b; IEEE802.11g; Bluetooth.

In one embodiment, the identities comprise the MAC addresses of the other devices.

In one embodiment, the reference identities comprise the identities of the other devices compared on a previous successful authentication attempt.

In one embodiment, the comparison threshold comprises having at least a predetermined percentage of the same identities of the other devices as the reference identities.

In one embodiment, in said step of comparing a proximity range value to a reference value, the comparison threshold comprises having at least a predetermined percentage of the same identities of the other devices as the reference identities.

In one embodiment, in the comparing step, identities corresponding to some other devices are weighted more highly than other identities.

In one embodiment, for each other device identity, the weighting is dependent on one or more of the following: the range of mobility of the respective other device; and/or the communications mode used to identify the other device.

In one embodiment, in response to an authentication challenge received from a server, the user device performs said step of identifying said other wireless devices and forwards said identities to said server for use in said comparing step.

In one embodiment, said user device sends an updated proximity range value at subsequent points of time following said initial authentication, and if an updated proximity range values exceeds said acceptable proximity range, said server issues an authentication challenge, and wherein in response to an authentication challenge received from a server, the steps in above-described authentication method are repeated.

Another aspect of the invention relates to a method of authenticating a mobile wireless user device, the method comprising the user device performing the steps of: receiving an authentication challenge from a server; identifying other wireless devices as being in its proximity using wireless communication with said other devices; and forwarding said identities to said server in response to said challenge.

In one embodiment, the method further comprises the user device performing the steps of: determining a proximity range value for at least one identified device indicating the proximity range of said identified device to said user device; and forwarding said proximity range value to said server in response to said challenge.

Another aspect of the invention relates to a method of authenticating a wireless user device, the method comprising a server performing the steps of: forwarding an authentication challenge to said user device; receiving identities of other devices determined as being in the proximity of the user device in response to said challenge; comparing said identities with reference identities for said user device; and authenticating said user device when the comparison meets a threshold.

In one embodiment, the server further performs the steps of: receiving at least one proximity range value in association with a device identity, said proximity range value indicating the range of said identified device to said user device; comparing said received proximity range value with a stored proximity range value; authenticating said user device when said received proximity range value is less than or equal to said stored proximity range value.

Another aspect of the invention relates to processor code which when executed on a processor is arranged to cause the processor to carry out a method aspect.

Another aspect of the invention relates to a system for authenticating a wireless user device, the system comprising: means for identifying other devices as being in the proximity of the user device using wireless communication between the user device and the other devices; means for comparing said identities with reference identities; means for authenticating said user device when the comparison meets a threshold.

In one embodiment, the system further comprises: means for receiving a proximity range value for each identified other device said value indicating the proximity range of said identified device to said user device; means for comparing said received proximity range value with a stored proximity range value; and means to authenticate said user device when said received proximity range value is less than or equal to said stored proximity range value.

Another aspect relates to a wireless user device arranged to be authenticated in use according to the method aspects, the device comprising: means for receiving an authentication challenge from a server; means for identifying other wireless devices as being in the proximity of the device using wireless communication with the other devices; and means for forwarding said identities to said server in response to said challenge.

In one embodiment, the device further comprises: means for determining a proximity range value for each identified other device said value indicating the proximity range of said identified device to said user device; and means for forwarding said proximity range to said server in response to said challenge in association with said other device identity.

Another aspect of the invention comprises a server for authenticating a wireless user device, the server comprising: means for forwarding an authentication challenge to said user device; means for receiving identities of other devices in the proximity of the user device in response to said challenge; means for comparing said identities with reference identities for said user device; and means for authenticating said user device when the comparison meets a threshold.

In one embodiment, the server further comprises: means for receiving a proximity range value in association with an identity for one or more of said other devices, each proximity range value indicating the proximity of said other device to said user device; means for comparing each said received proximity range value with a stored proximity range value; and means to authenticate said user device when each received proximity range value is less than or equal to said stored proximity range value associated with said device identity.

Thus in general terms the present invention provides a mechanism for authenticating a mobile device based on location related information or a "logical location", but without requiring an actual location. This provides a convenient method of authentication which is simple to implement, and in an embodiment can be implemented using existing mobile device hardware. Authentication may be required at the work place for example, before a workers mobile device can access work-related documents or resources such as Internet access.

The authentication mechanism enables a mobile device to be authenticated through its history of proximity of location to other devices, regardless of the physical location of any of the devices. In this way, the physical location at which the user's terminal may change, but if the user is still seeking access through devices with which it has a history of being associated, the user can be authenticated the mobile terminal having a known association with the other devices.

The mobile user device identifies or discovers other devices, for example wireless devices, within its vicinity and forwards this information to the authenticating authority. If this information matches previous or otherwise pre-determined information (reference identities), then the device is authenticated. In other words the forwarded identities are compared with reference identities, provided by identities forwarded during a previous authentication session for example. If the comparison meets a predetermined threshold, for example that 80% of the forwarded identities are the same as the reference identities, then the device is authenticated. The previous information may be a list of identifiers of the other devices supplied by the mobile user device on its last successful authentication. The pre-determined information may be a list of identifiers for fixed devices located about a "safe" location for the user device, for example the user's work station. Furthermore a combination of previous identifier lists may be used, in order to update for movements in other devices, such as a co-worker moving to another location and taking his other devices with him.

A mobile wireless user device may query other wireless devices from its users work desk, these will be the same or largely the same each time the mobile device is at this location i.e. there will be a match. The term match is used to indicate a comparison threshold similarity, and not necessarily an identical match of all identifiers supplied by the user device with previously supplied identifiers. This may be a sufficient number or percentage of exact individual matches for example. Thus if 90% of the identifiers supplied are the same as those on a list stored by the server or authentication authority, then a match is declared. In other words when the device is at its users work station it can be authenticated simply by providing local device identifiers, whereas at a restaurant or other non-regular location there will not be any "familiar" devices and therefore authentication will not be granted. In this case, a more traditional means of authentication can be used, for example providing a username and password.

Thus the user is saved the inconvenience of having to enter username and password details (or other credentials) each time they wish to be authenticated at work or some other regular "safe" location. This makes the authentication process more useable, faster, and less prone to user error, such as inaccurate data entry.

In an embodiment the user device identifies the other devices using wireless access technologies such as WLAN air interface protocols for example IEEE802.11a (WiFi), personal area network air interface protocols such as Bluetooth™, however other wireless protocols could alternatively or additionally be used. Preferably at least one medium to short range wireless access technology is used in order to "locate" the user device to within a predetermined range. For example a WiFi WLAN normally provides coverage over approximately a 100 m radius (medium range), and a Bluetooth piconet is typically restricted to a range of approximately 10 m (short range). More preferably at least one short range wireless access technology (eg Bluetooth) is used.

As an alternative, the level of authentication granted may depend on the wireless access technology(s) used. For example, access to a top secret company document may only be granted when a matching Bluetooth identifier(s) is given (indicating the user is more likely to be within 10 m of his desk). Whereas access to the company Intranet may be granted even if only WiFi discovered identifiers are matched (indicating the user is likely to be somewhere within the company premises). If only a GSM cell identifier is provided, then only very limited (or no) access to company resources may be given.

Additionally or alternatively, a matching algorithm may be used which weights certain wireless access technology gathered identifiers more highly than others. For example a Bluetooth identifier may be weighted more highly than a WiFi identifier, reflecting the greater certainty that the user device is within a "safe" area, for example within 10 m of their work station or in their home.

In particular in one aspect there is provided a method of authenticating a wireless user device. The method comprises identifying other wireless devices using wireless communication between the user device and the other devices. (In an embodiment this comprises using a number of wireless access technologies such as Bluetooth and WiFi to directly interrogate the other devices. Preferably all other devices within range of the user devices wireless access technologies are so queried. The gathered identifies are forwarded to an authenticating authority such as a server the user device has requested a document from, in response to the authentication challenge from this server.) The method further comprises comparing the identities with reference identities, for example previously forwarded identities corresponding to the user device's user work station. The user device is authenticated if this comparison meets a threshold, for example if there is an 80% match between the forwarded identities and those forwarded on a previous successful authentication attempt.

The term wireless access technology is used to refer to any suitable communications protocol using electromagnetic radiation (EMR) as a medium. This will include radio frequencies as well as free-space optics for example (eg infrared). Different versions of a base or generic standard are considered for the purposes of this specification as different wireless access technologies, thus for example IEEE802.11a and IEEE802.11b represent different wireless access technologies, even though they are both known generically as WiFi.

For the sake of simplicity of explanation however, the term WiFi is used in the detailed description to refer to any one of the various IEEE802.11 protocol standards.

In an embodiment the wireless access technologies are used to directly (ie without using an intermediate node) communicate with one or more of the other devices. This may include communicating with an access point of a WiFi WLAN say in order to identify the other members of the WLAN without actually directly communicating with these other WLAN members.

There are also provided various apparatus such as server and client nodes, networks and systems or parts thereof corresponding to the above defined methods.

DESCRIPTION OF THE DRAWINGS

Embodiments will now be described by reference to the following drawings, by way of example only and without intending to be limiting, in which.

DETAILED DESCRIPTION

Figure 1:
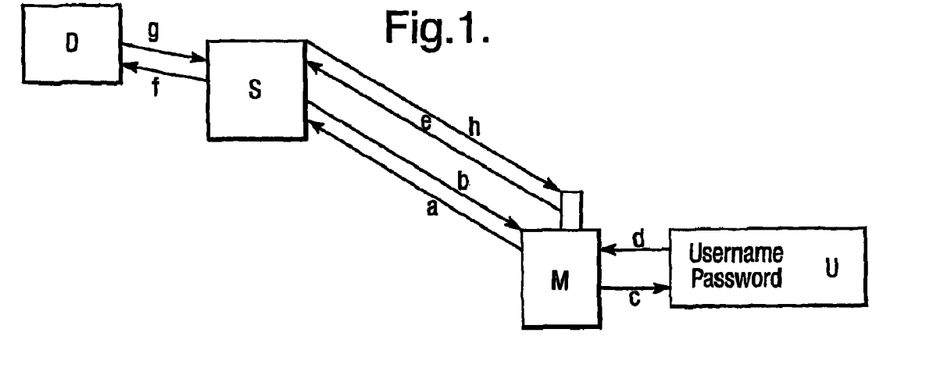
FIG. 1 illustrates a known authentication method.

FIG. 1 shows a well known means of authenticating a mobile device such as a laptop computer or PDA with wireless access to a company network. The mobile device M sends a request (operation step a) to a company server S in order to access a company document D. The request may be sent using a wireless connection, for example a WiFi link. The server S challenges (b) the mobile device M to provide suitable authentication data. The mobile device M then requires (c) a user U to enter their company username and password into the device (d). This data is passed back (e) to the server S in response to the challenge. The server then checks whether the supplied password and username are valid, and if so carries out the mobile device's request and obtains (f and g) the requested company document D. The mobile device having been authenticated, the document D is then forwarded (h) to the mobile device M by the server S.

This authentication process is typically required for each application on the mobile device which requires access to the company resources. For example in addition to accessing document D via a word processing application, the device may also require access to an email server via an email client, the internet via a browser, and a database via a suitable database application. Thus each time these resources are requested by the mobile device M, the user has to re-enter their username and password. In some cases the resources may require different usernames and passwords, further taxing the user.

Figure 2:
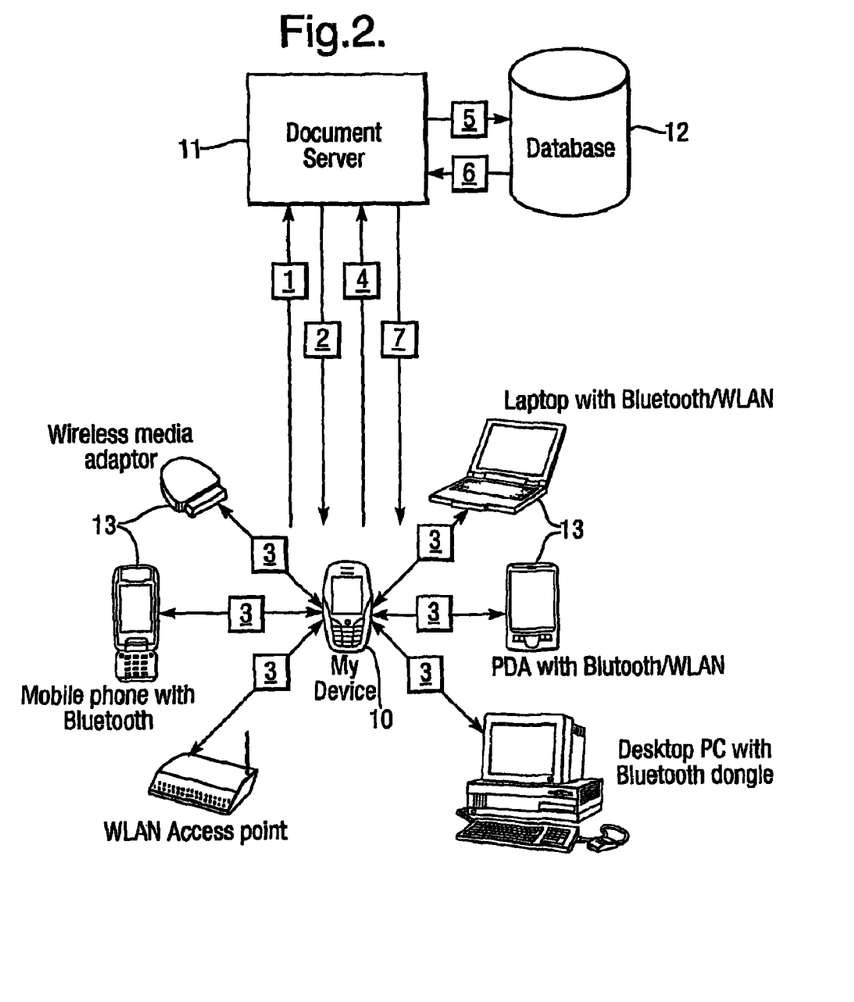
FIG. 2 illustrates an authentication method according to an embodiment.

A system according to an embodiment is illustrated in FIG. 2, and comprises a wireless user device 10 such as a Smartphone, a document server 11 such as a company network, a database 12 coupled to the server and holding authentication information related to the user device 10, and a number of wireless devices 13 located about the user device. The user device 10, other wireless devices 13, and document server 11 communicate with each other wirelessly, for example over a WLAN such as IEEE802.11a (WiFi), Bluetooth™ or some other wireless communications technology.

Instead of supplying a username and password for authentication by the document server or authentication authority 11, the user device 10 identifies other wireless devices 13 located around it and notifies the server 11 of these. The other devices 13 might be work related devices such as WLAN base stations or access points, wireless printers and other computer peripheral equipment, other WLAN mobile stations, and other worker's mobile phones. These devices may be fixed such as company network access points, or they may be mobile such as co-workers mobile phones. Thus on different occasions the devices identified by the user device 10 may be different, but there will be some similarity. For example the fixed devices 13 will be the same each time the user is at his or her desk, and some of the mobile devices are also likely to be present, though not all of them may be.

The identification of the other devices 13 is performed using one or more wireless access technologies available to the user device 10. The actual mechanics of obtaining or discovering a suitable identifier (eg a MAC address) will depend on the wireless protocol used as will be apparent to those skilled in the art, but may comprise simply querying the other devices or requesting a connection with the other devices in order to discover their identities. A convenient identifier is the other device's MAC address, however other identifiers may alternatively be used, such as a Bluetooth address, a fixed IP address, or a unique serial number or other identifying data given to the other device. Each wireless device has a unique global MAC or medium access control address and so can be uniquely identified. These addresses are used in all common wireless access technologies and so provide a convenient manner for identification.

The identifiers gathered by the user device 10 provides the device with a logical location as identified by the presence of neighbouring devices. This can be implemented as a list of device 13 identifiers such as MAC addresses and is termed here a location signature. The device 10 may be configured to exhaustively identify all other mobile devices 13 it can using its available wireless access technologies, or a sub-set of these devices 13 such as the first 3 from each access technology. Similarly the user device 10 may be configured to use any number of its available wireless access technologies.

Once the identities of other wireless devices 13 in the vicinity have been gathered, the user device 10 sends these to the document server 11 as a response to the authentication challenge issued by the server 11. The identities information or authentication response therefore can be correlated with a location of the user device, for example the user's work station. Thus the response provides pseudo or logical location information (location signature) about the user device 10, based on its presence relative to other devices. After the first time this identity gathering has been performed—which may require completion with the usual username and password— the various gathered identities are stored by the database 12 as a (base) "location signature" or reference identities or identifiers for the user device 10. Thereafter, when the user device 10 responds to an authentication challenge from the server 11 with the identities of nearby wireless devices 13 (its current location signature), these can be compared with the "base signature" or reference identities, and if within a predetermined likeness (a match or comparison threshold is met) then access to the network resources can be granted. Alternatively the identities of the other devices or location signature can be compared with reference identities such as the location signature provided by the user device 10 the last time it was successfully authenticated. As a further alternative a combination of recently provided location signatures may be stored by the database 12. This allows the system to take account of changes at the user's workplace. Such changes may involve a co-worker moving away and/or another one moving nearby, or nearby wireless access points being upgraded (with different MAC addresses).

If the user device 10 is at the user's work station, then the gathered identities will be the same or largely overlap with those gathered on previous occasions, for example the "base" location signature or the "last" location signature. However, if the user device 10 is at another part of the work building, the surrounding wireless devices 13 will be different to those about the user's work station, and will not match the user device's location signature as stored by the database 12. In this situation, access will be denied or the user will have to enter their username and password to gain access. Similarly if the device has been stolen and the thief is attempting to access company resources from outside the company building, again the location signature from this location is not likely to match the signature(s) stored on the database 12 and access will not be granted on the basis of location. It is unlikely that the thief will operate the device 10 near the user's usual work station.

This logical location based authentication may also be based on a second location signature, for example the user's home where again the devices will be the same or similar each time their identifies are gathered. The second location signature may require a higher (or lower) level of matching, for example because security cannot be controlled as tightly as within and about company premises.

Determining whether there is a match with the signature stored by the database 12 and the one presented by the user device 10 to the server 11 can be done in a number of ways. For example, it may be based simply on a percentage of the identifiers presented and those stored matching exactly. Thus where the match parameter or threshold is 80%, if 8 out of 10 MAC addresses on the authentication response from the user device 10 are the same as those on the list stored by the server 11, then authentication is confirmed.

In a further alternative, in addition to requiring a matching location signature to set up a secure session with the server, the server 11 may be configured to periodically require the user device's current location signature. If this changes abruptly then the secure session is terminated.

In a further application, the user device 10 may be configured to "activate" logical location based authentication following successful entry of username and password a number of times. The location signatures may be gathered during each username/password entry, and be used for the newly activated logical location authentication.

Figure 3:
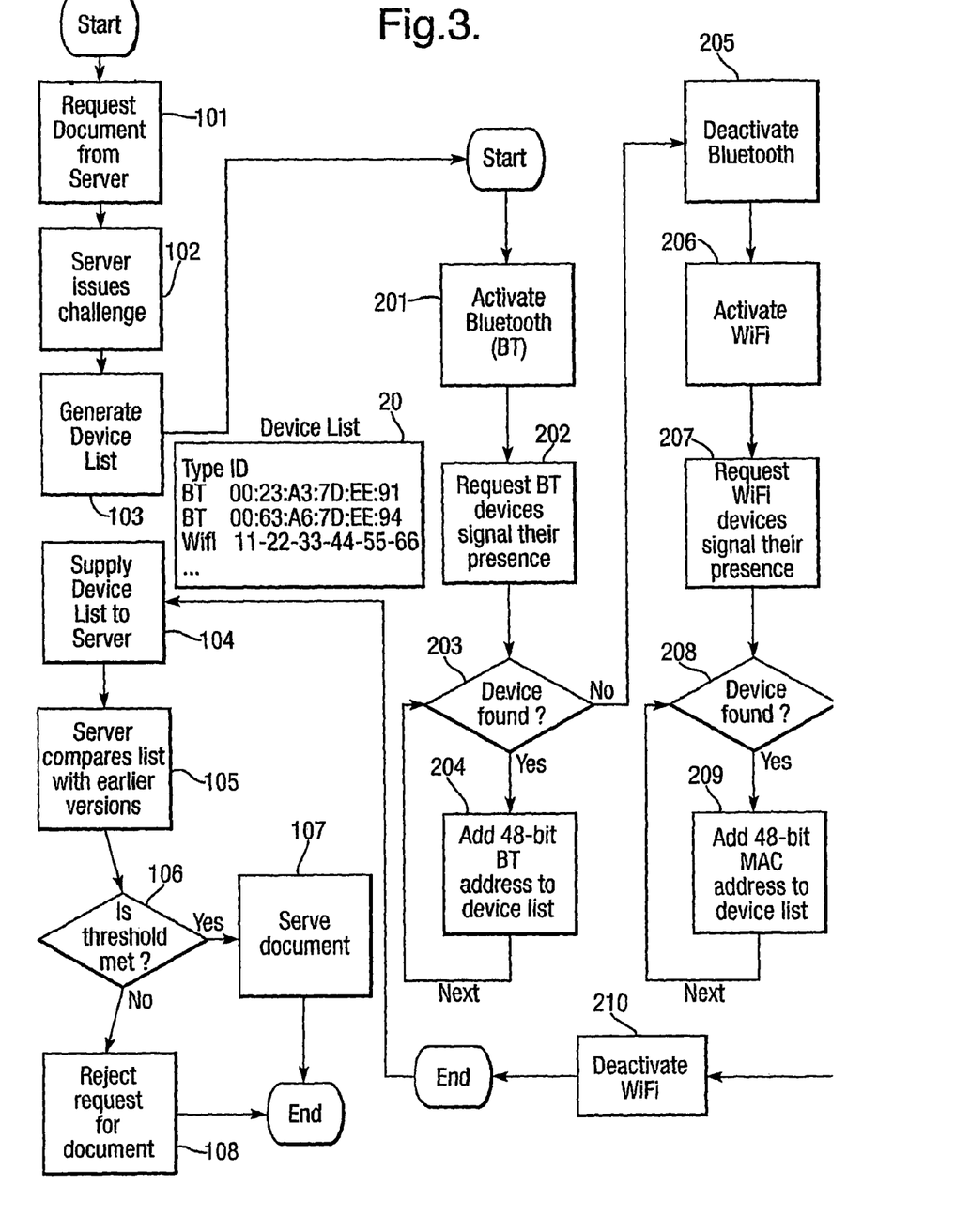
FIG. 3 is a flow chart showing operation of a system according to an embodiment.

FIG. 3 is a flow chart of a method according to an embodiment. Referring also to the signalling references in FIG. 2, the user device 10 requests a document (or other resource) from the server 11 (step 101 of FIG. 3; signal flow 1 of FIG. 2). The server 11 responds by issuing an authentication challenge (102; 2). This prompts the user device 10 to generate a location signature according to its current logical location (103).

To do this, the device 10 enables a number of its available wireless technologies or protocols, in this example Bluetooth and WiFi (201, 206; 3). Other wireless technologies which could be used include: GSM, WiMax (IEEE802.16), 3 G (CDMA2000/WCDMA), DSRC (Dedicated Short Range Communication)—a high speed vehicle based 100-1000 m range wireless standard, DECT (Digital Enhanced Cordless Telecommunications)—a short range wireless standard. Wireless access technologies which can directly communicate with other devices (eg Bluetooth and WiFi) are preferred, but protocols using an intermediate node such as a GSM base station could also be used. Alternatively such intermediate node wireless access technologies could be used simply to provide part of the identifier for the other device, for example its GSM cell ID.

It is possible to obtain a location signature using only a single technology, however two or more such technologies or air interface protocols can also be used. Some wireless access technologies (eg WiFi) can operate over a large area (eg a building or 100 m radius) which reduces the security of the system, whereas other short range technologies (eg Bluetooth) operate over a much shorter range such as 10 m. Therefore it is preferred that at least one short range air interface protocol is used.

To generate the authentication location signature list (20), first Bluetooth is activated (201), and the user device 10 requests that other Bluetooth devices within range signal themselves (202). This may be done by using Bluetooth's SDP (Service Discovery Protocol). This is invoked by Bluetooth terminals to discover other Bluetooth terminals in it's neighbourhood. Once invoked, the user device SDP gathers other device's addresses and supported services as is known. This data is made available to applications on the user's device using an API (application programmers interface), and can therefore be gathered and the Bluetooth address for each other device 13 added to the list (203, 204). If no, or no more devices 13 are found, the user device 10 deactivates its Bluetooth capability (205).

The device 10 then activates its WiFi capability (206), The user device 10 then requests other WiFi devices to signal their presence (207). This can be achieved in a number of ways, for example by listening for the beacon frame from access points within range in centralised WLAN's, or a "probe request" can be sent by the device to ask an AP (access point) for details about itself (eg its MAC address). A passive RF scanning technique can also be used by eaves dropping other traffic in the WLAN. Whilst payloads are encrypted, headers are not and so it is possible to get identity information this way. One or all of these methods may be used.

If a device is found (208), then its MAC address is sought (209). This may be achieved in a number of ways as would be known to those skilled in the art, and will also depend on whether a centralised or ad hoc Wireless network is involved. For example, the user device 10 may attempt to join an active BSS supported by one of the access points, and this may require knowledge of a key. However if this is related to a BSS provided about the workplace, then this key may already be stored by the device 10. Once the device 10 has been authenticated, it then associates with the other stations of the BSS in order to discover their identities (MAC addresses). Once all of the devices that signalled their presence have been queried, including if necessary the authentication and association process in order to query mobile stations associated with a presence signalling access point, then the user device 10 deactivates its WiFi capability (210).

The gathered device identifiers or MAC addresses are added (204, 209) to a device list 20. This may simply comprise a device type such as Bluetooth or WiFi and its associated MAC address. Or more generally, simply the MAC address of each queried device. Preferably however both the device type and its address is included as this provides an additionally level of security, for example by noting that some other devices 13 support both RF technologies. Additional data could also be added to the list about the other devices, for example what services that a Bluetooth device supports—these can be expressed as UUID numbers.

The list may simply be a plain text file including the data in alpha-numeric form. Preferably this is encrypted for transmission to the server. This may be accomplished by opening a secure http session with the server 11 for example.

Once the identifier list or location signature 20 has been created, it is forwarded to the server (104; 4). The server 11 makes a request (105; 5) to a database 12 for the signature or signatures 20 that were supplied on previous authentication attempts. The database 12 supplies these (105; 6) to the server 11 which compares the stored versions of the identifier lists 20 with the recently supplied signature or list 20. In comparing the signatures 20, the server determines whether a threshold has been met (106), for example that 90% of the device details from the recent list are identical with those provided in the previous list, a base list, or a list which is a combination of previously supplied lists.

If the recently supplied list or signature meets the predetermined threshold, then the server 11 supplies the requested document (107; 7). If the threshold is not meet, a denial of service message is sent (108; 7), which may include the option for supplying the standard username and password authentication.

Figure 4:
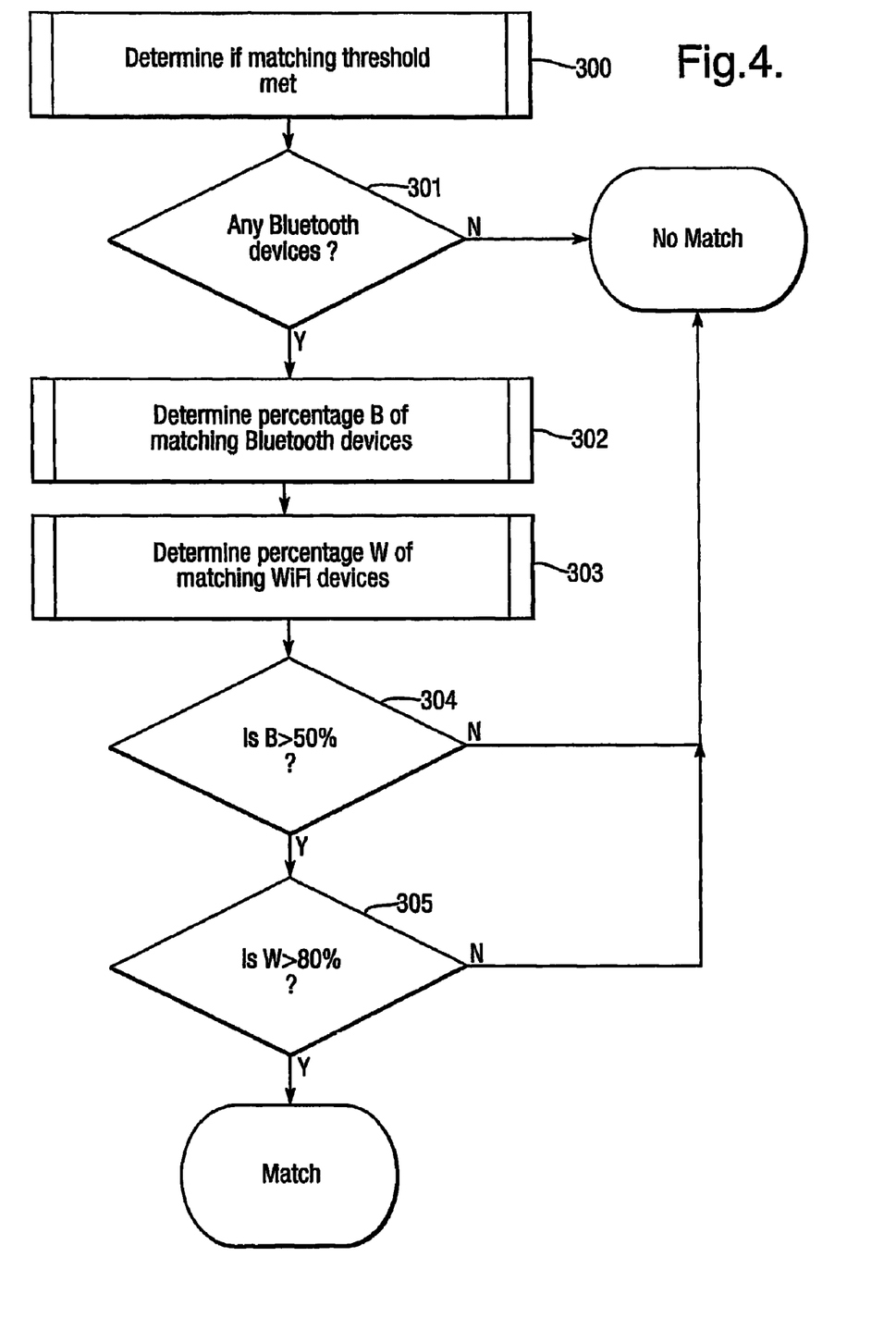
FIG. 4 is a flow chart showing operation of a system according to another embodiment.

FIG. 4 shows a flow chart illustrating a further embodiment. In this arrangement the process of determining whether there is a match incorporates weighting according to the wireless access technology used. For example Bluetooth gathered identifiers may be given greater weight as they indicate the user is within a more restricted range (10 m) then WiFi gathered identifiers (100 m).

The manner in which it is determined whether an identifier is from one or another access technology can be varied, for example it may simply rely on the type of identifier provide such as a Bluetooth address or a MAC address for WiFi devices. Alternatively the user device may be configured to tag each identifier in the location signature file with the wireless access technology used.

The algorithm can be implemented as part of the threshold decision step (106) in FIG. 3. The signature location file (20) from the requesting user device is received (300) an analysed. First it is determined whether any Bluetooth identifiers have been received (301). If not, then the threshold has not been meet, and the algorithm will return a "no match". If there are Bluetooth identifiers, then the percentage of these matching those of the stored location signature(s) B is determined (302). Similarly the percentage of WiFi identifiers matching those on the stored list W is also determined (303).

It is then determined whether the percentage of matching Bluetooth identifiers is above 50% (304). If not then the matching threshold has not been met. If the Bluetooth identifier threshold has been met, then it is determined whether a WiFi identifier threshold (80%) has been met (305). If not then the overall matching threshold has not been met, otherwise the algorithm indicates that the matching threshold has been met.

By allocating different matching thresholds for different access technologies, then these technologies can be weighted. In this example, Bluetooth identifiers are weighted more importantly than WiFi identifiers, indicating that it is more important for the user to be close to their logical location—for example within 10 m.

Different weighting algorithms may be used for different system resources, for example a top secret document only being released near the users usual logical location, whereas email access may be granted anywhere in the company building.

Similarly, fixed other devices 13 may be given a higher weighting than mobile other devices, reflecting the fact that the fixed devices would normally be expected to be the same each time, whereas the presence of the mobile devices is more likely to vary on a day to day basis.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A method of authenticating a mobile wireless user device, the method comprising:
the user device identifying other devices detected as being within the proximity of the user device using at least one mode of wireless access technology communications between the user device and the other devices to generate a current location signature comprising a plurality of weighted device identifiers;
transmitting the current location signature to a server arranged to:
compare the weighted identifier of each of said other devices listed in the current location signature with earlier listed reference weighted device identifiers comprising an authenticated reference signature;
whereby said user device is authenticated when the identifier comparison of the device identifiers listed in the current location signature with earlier reference device identifiers listed in the authenticated reference signature meets a matching threshold comparison condition for authentication,
wherein each said weighted device identifier comprises a device identifier which is weighted differently in dependence on each different wireless access technology communications mode used to identify at least one of the other devices in said location signature.

2. A method as claimed in claim 1, wherein the method further comprises:
determining for at least one identified other device a proximity range value indicating the proximity of the device to the user device;
comparing said range value with a reference range value for said identified other device; and,
authenticating said user device if said proximity comparison indicates said proximity range value is an acceptable proximity range being a proximity range value less or equal to said reference proximity range value.

3. A method as claimed in claim 2, wherein said proximity range value is determined by said user device detecting a physical characteristic of a communications signal between at least one of said other wireless devices and said user device.

4. A method as claimed in claim 2, wherein said authenticating requires all proximity comparisons to indicate that said user device is within a range of proximity less or equal to a reference range for each of said other wireless devices.

5. A method as claimed in claim 2, wherein said authentication is performed automatically as soon as said user device enters a proximity range sufficient for authentication.

6. A method according to claim 2, wherein in said comparing a proximity range value to a reference value, the comparison threshold comprises having at least a predetermined percentage of the same identifiers of the other devices as the reference identifiers.

7. A method as claimed in claim 1, wherein said user device is further identified by its spatial location, wherein the spatial location is determined by the proximity of the device to a plurality of fixed spatial reference points associated with said other wireless devices.

8. A method according to claim 1, wherein the modes of wireless access technology communications comprises using one or more wireless access technologies to directly communicate with one or more of said other devices in order to request respective identifiers.

9. A method according to claim 8 wherein one or more said wireless access technologies are used to communicate with all said other devices having said wireless access technology capability within respective ranges of said user device.

10. A method according to claim 8 wherein the wireless access technology comprises one or more of the following group: IEEE802.11a; IEEE802.11b; IEEE802.11g; Bluetooth.

11. A method according to claim 1, wherein the identifiers comprise the MAC addresses of the other devices.

12. A method according to claim 1, wherein the reference identifiers comprise the identifiers of the other devices compared on a previous successful authentication attempt.

13. A method according to claim 1, wherein the comparison threshold comprises having at least a predetermined percentage of the same identifiers of the other devices as the reference identifiers.

14. A method according to claim 1 wherein, for each other device identifier, the weighting is dependent on the range of mobility of at least one of the respective other devices.

15. A method according to claim 1, wherein in response to an authentication challenge received from a server, the user device performs said identifying said other wireless devices and forwards said identifiers to said server for use in said comparing.

16. A method as claimed in claim 1, wherein the threshold comparison condition for authentication comprises a threshold percentage of current location signature device identifiers matching reference identifiers comprising an authenticated reference signature.

17. A method as claimed in claim 16, wherein an authenticated reference signature comprising device identifiers received from the user device when in a different geographic location from a current geographic location of the user device is used to authenticate the user device at the current location.

18. A method as claimed in claim 1, wherein an identifier for another device is tagged in the location signature file with the wireless access technology used to determine the identifier.

19. A method of authenticating a mobile wireless user device, the method comprising steps of:
identifying other devices detected as being within the proximity of the user device using at least one mode of wireless access technology communications between the user device and the other devices to generate a current location signature comprising respective weighted device identifiers for each identified other device;
comparing the identifier of each of said other devices listed in the current location signature with earlier listed reference device identifiers comprising an authenticated reference signature;
authenticating said user device when the identifier comparison of the listed device identifiers of the current location signature with the earlier listed reference device identifiers comprising the authenticated reference signature meets a threshold comparison condition for authentication,
determining for at least one of the identified other devices a proximity range value indicating the proximity of the device to the user device;
comparing said range value with a reference range value for at least one of said identified other devices and
authenticating said user device if said proximity comparison indicates said proximity range value is an acceptable proximity range being a proximity range value less or equal to said reference proximity range value,
wherein said device sends an updated proximity range value at subsequent points of time following said initial authentication, and if an updated proximity range values exceeds said acceptable proximity range, a server issues an authentication challenge, and wherein in response to an authentication challenge received from a server, repeating the above steps to authenticate the device, and
wherein each said weighted device identifier comprises a device identifier which is weighted differently in dependence on each different wireless access technology communications mode used to identify at least one of the other devices in said location signature.

20. A method of authenticating a mobile wireless user device, the method comprising the user device performing:
receiving an authentication challenge from a server;
identifying other wireless devices as being in its proximity using a mode of wireless access technology communication with said other devices; and
forwarding a current location signature comprising said identifiers to said server in response to said challenge, whereby if said current location signature when compared with an authenticated reference signature meets a threshold condition for authentication, said user device is authenticated,
wherein said current location signature comprises at least one weighted device identifier comprising a device identifier for at least one of said other devices which is weighted differently, based on different wireless access technology communications modes, than a device identifier used to identify another one of said other devices.

21. A method as claimed in claim 20, further comprising the user device performing:
determining a proximity range value for at least one identified device indicating the proximity range of said at least one identified device to said user device; and
forwarding said proximity range value to said server in response to said challenge.

22. A method as claimed in claim 21, further comprising:
receiving the proximity range value in association with an identifier for one or more of said other devices, each proximity range value indicating the proximity of one or more of said other devices to said user device;
comparing each said received proximity range value with a stored proximity range value;
authenticating said user device when each received proximity range value is less than or equal to said stored proximity range value associated with said device identifier.

23. A method of authenticating a wireless user device, the method comprising a server performing:
forwarding an authentication challenge to said user device;
receiving a current location signature from said user device, the current location signature comprising a list of weighted identifiers for a plurality of other devices determined by said user device as being in the proximity of the user device in response to said challenge using a wireless access technology communications mode;
comparing said identifiers in said current location signature with reference identifiers comprising an authenticated reference signature for said user device; and
authenticating said user device when the comparison meets a threshold condition for authentication, and
wherein each said weighted device identifier comprises a device identifier which is weighted differently in dependence on each different wireless access technology communications mode used to identify at least one of the other devices in said location signature.

24. A method as claim 23, wherein the server further performs:
receiving at least one proximity range value in association with a device identifier, said proximity range value indicating the range of said identified device to said user device;
comparing said received proximity range value with a stored proximity range value;
authenticating said user device when said received proximity range value is less than or equal to said stored proximity range value.

25. A system for authenticating a wireless user device, the system comprising:
a processor;
a module which, when executed, identifies other devices as being in the proximity of the user device using wireless communication between the user device and the other devices to generate a current location signature comprising a list of weighted identifiers for said other devices;
a module which, when executed, compares a plurality of said weighted identifiers for said other devices in said current location signature with reference weighted identifiers, comprising an authenticated reference signature; and
a module which, when executed, authenticates said user device when the comparison between said current location signature and said authenticated reference signature meets a threshold condition for authentication,
wherein each said weighted device identifier comprises a device identifier which is weighted differently in dependence on each different wireless access technology communications mode used to identify at least one of the other devices in said location signature.

26. A system as claimed in claim 25, wherein the system further comprises:
a module which, when executed, receives a proximity range value for each identified one of the other devices said value indicating the proximity range of said identified device to said user device;
a module which, when executed, compares said received proximity range value with a stored proximity range value;
a module which, when executed, authenticates said user device when said received proximity range value is less than or equal to said stored proximity range value.

27. A wireless user device arranged to be authenticated according to a method comprising:
the user device identifying other devices detected as being within the proximity of the user device using at least one mode of wireless access technology communications between the user device and the other devices to generate a current location signature comprising a plurality of weighted device identifiers;
transmitting the current location signature to a server arranged to:
compare the weighted identifier of each of said other devices listed in the current location signature with earlier listed reference weighted device identifiers comprising an authenticated reference signature;
whereby said user device is authenticated when the identifier comparison of the device identifiers listed in the current location signature with earlier reference device identifiers listed in the authenticated reference signature meets a matching threshold comparison condition for authentication,
wherein each said weighted device identifier comprises a device identifier which is weighted differently in dependence on each different wireless access technology communications mode used to identify the other devices in said location signature
the device having a processing system which, when executed:
receives an authentication challenge from a server;
identifies other wireless devices as being in the proximity of the device using the at least one mode of wireless access technology communications with the other devices;
weights each said device identifier differently in dependence on the wireless access technology communications mode used to identify at least one of the other devices;
generates a current location signature comprising a list of said weighted identifiers for said other wireless devices identified by the user device; and
forwards said current location signature comprising said weighted identifiers to said server in response to said challenge.

28. A wireless user device as claimed in claim 27, wherein the wireless user device has a further configuration to:
determine a proximity range value for each identified other device said value indicating the proximity range of said identified device to said user device;
forward said proximity range to said server in response to said challenge in association with said other device identifier.

29. A server for authenticating a wireless user device, the server comprising:
a processing system which, when executed:
forwards an authentication challenge to said user device;
receives a current location signature comprising a list of weighted identifiers for other devices in the proximity of the user device in response to said challenge;
compares current location signature listed identifiers with reference identifiers comprising an authenticated reference signature for said user device; and
authenticates said user device when the comparison meets a threshold for authentication,
wherein each said device identifier is weighted in said location signature in dependence on which wireless access technology communications mode was used to identify at least one of the other devices in said location signature.

30. A method of authenticating a mobile wireless user device, the method comprising:
the user device identifying other trusted devices detected as being within the proximity of the user device using wireless communication between the user device and the other trusted devices to generate a current location signature;
transmitting the current location signature to a server arranged to:
compare the identifier of each of said other devices listed in the current location signature with earlier listed reference device identifier comprising an authenticated reference signature;
whereby said user device is authenticated when the identifier comparison of the listed device identifiers of the current location signature with the earlier listed reference device identifiers comprising the authenticated reference signature meets a matching threshold comparison condition for authentication,
wherein each said other trusted device identifier is weighted in dependence on the wireless communications access technology used to identify at least one of the other devices in said location signature and wherein different wireless communications access technologies have different matching thresholds allocated.

* * * * *